(12) United States Patent
Imaizumi

(10) Patent No.: US 6,829,291 B1
(45) Date of Patent: Dec. 7, 2004

(54) RECEIVING APPARATUS AND SYNCHRONIZATION CAPTURING METHOD

(75) Inventor: Satoshi Imaizumi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/719,821
(22) PCT Filed: Apr. 11, 2000
(86) PCT No.: PCT/JP00/02334
§ 371 (c)(1),
(2), (4) Date: Dec. 18, 2000
(87) PCT Pub. No.: WO00/64065
PCT Pub. Date: Oct. 26, 2000

(30) Foreign Application Priority Data

Apr. 16, 1999 (JP) .......................... 11-110180

(51) Int. Cl.[7] ............................... H04B 1/69
(52) U.S. Cl. .................................... 375/150
(58) Field of Search ................ 375/150, 130, 375/147, 145, 316, 354, 367; 370/342, 335, 320, 441

(56) References Cited

U.S. PATENT DOCUMENTS 5,832,021 A * 11/1998 Kondo ........................ 375/150
5,960,028 A * 9/1999 Okamoto et al. ........... 375/130

FOREIGN PATENT DOCUMENTS

| EP | 0814573 | 12/1997 |
|----|---------|---------|
| JP | 5114896 | 5/1993 |
| JP | 6343067 | 12/1994 |
| JP | 10013302 | 1/1998 |
| JP | 10051504 | 2/1998 |
| JP | 10271034 | 10/1998 |
| JP | 00188562 | 7/2000 |
| WO | 97033401 | 9/1997 |

OTHER PUBLICATIONS

PCT International Search Report dated Jul. 18th, 2000.

* cited by examiner

Primary Examiner—Khai Tran
(74) Attorney, Agent, or Firm—Stevens, Davis, Miller & Mosher, LLP

(57) ABSTRACT

A correlation calculating section 103 calculates correlation values from a baseband signal from a radio receiving section 102. A delay profile generating section 105 generates a delay profile based on the correlation value from a selecting section 104. A peak detecting section 106 detects a peak correlation value and a peak phase from the delay profile, outputs the peak correlation value to a weighting section 109, and also outputs the peak phase to a correlation phase adjusting section 107 and a demodulation control section 111. A correlation phase adjusting section 107 adjusts a phase of a spreading code auto-correlation value in accordance with the peak phase, and the weighting section 109 adjusts amplitude of the spreading code auto-correlation value subjected to phase adjustment in accordance with the peak correlation value. A correlation eliminating section 110 eliminates the spreading code auto-correlation values subjected to phase adjustment from the correlation values.

11 Claims, 13 Drawing Sheets

DELAY PROFILE

SPREADING CODE
AUTO-CORRELATION

SPREADING CODE AUTO-CORRELATION
AFTER ADJUSTING PHASE

SPREADING CODE AUTO-CORRELATION
AFTER ADJUSTING AMPLITUDE

DELAY PROFILE AFTER ELIMINATING
CODE CORRELATION

DELAY PROFILE

SPREADING CODE AUTO-CORRELATION

DELAY PROFILE

SPREADING CODE AUTO-CORRELATION

"RECEIVING APPARATUS AND SYNCHRONIZATION CAPTURING METHOD"

TECHNICAL FIELD

The present invention relates to a receiving apparatus and particularly to a receiving apparatus that performs communication of code division multiple access (hereinafter referred to as "CDMA") and a synchronization capturing method.

BACKGROUND ART

In communication using CDMA, the receiving apparatus provides despread processing to the signal, which has been spread using a spreading code at the transmitting apparatus and transmitted therefrom, at the same phase as that of the transmitting apparatus, whereby allowing the signal to be demodulated. Therefore, for synchronization of data demodulation, it is necessary to detect with what timing the received signal should be multiplied by the known spreading code before performing data communication.

The received signal is multiplied by the known spreading code as shifting the phase. Then, it is detected how much degree the phase is shifted to obtain cross correlation. This processing is called synchronization capturing. In some cases, synchronization capturing is provided to a plurality of transmitting apparatuses. The conventional receiving apparatus that performs such synchronization capturing will be described with reference to FIG. 1.

FIG. 1 is a block diagram showing the configuration of a conventional CDMA receiving apparatus. In FIG. 1, signals transmitted from the respective transmitting stations are received via an antenna 1301 and outputted to a radio receiving section 1302. The signals received via the antenna 1301 are converted to received baseband signals at the radio receiving section 1302. This received baseband signals are outputted to a correlation calculating section 1303.

In the correlation calculating section 1303, the received baseband signals are subjected to despread processing using the same known spreading code as one that is used in the spread processing at the transmission station, whereby calculating correlation values. As a correlation calculating section 1303, a matched filter, a sliding correlator and the like are conventionally known.

The correlation values calculated by the correlation calculating section 1303 are outputted to a delay profile generating section 1304. In the delay profile generating section 1304, the above correlation values are subjected to average processing to suppress noise components contained in the correlation values outputted from the correlation calculating section 1303, whereby a delay profile is generated. The generated delay profile is outputted to a peak detecting section 1305.

The peak detecting section 1305 detects a maximum value (hereinafter referred to as "peak correlation value") of the correlation values averaged in the delay profile outputted from the delay profile generating section 1304. Also, a phase (hereinafter referred to as "peak phase") of the detected peak correlation value of the delay profile is outputted to a demodulation control section 1306. Despread processing is provided to the received signals in accordance with this peak phase. This makes it possible to demodulate the signals transmitted from the respective transmitting stations.

The demodulation control section 1306 stores the peak value outputted from the peak detecting section 1305. Also, a timing signal for demodulating the signal transmitted from each transmitting station is outputted to a baseband demodulating section 1307. The baseband demodulating section 1307 provides despread processing to the received baseband signal outputted from the radio receiving section 1302 based on the timing signal outputted from the demodulating control section 1306, with the result that demodulated data corresponding to each transmitting station is obtained.

However, in the conventional CDMA receiving apparatus, the correlation values calculated using the known spreading code contain influences of auto-correlation components of this spreading code. This causes a problem in which the peak phase corresponding to each transmitting station is not correctly detected for various kinds of factors set forth below. Here, the following will explain an example showing a case in which synchronization capturing is provided to the signals transmitted from the respective transmitting stations with different timing. In this case, the transmitting station, which can obtain the highest reception field intensity by use of the receiving apparatus, is referred to as "first transmitting station" and the transmitting station, which can obtain reception field intensity lower than that of the first transmitting station, is referred to as "second transmitting station."

First, at the time of detecting the peak phase corresponding to the second transmitting station, the reception field intensity of the signal from the second transmitting station is lower than that of the signal from the first transmitting station. For this reason, the original peak correlation value of the second transmitting station is smaller than the auto-correlation component in the signal from the first transmitting station in some instances. In such a case, there is a possibility that the auto-correlation component will be detected as the peak correlation value of the second transmitting station. As a result, the peak value of the second transmitting station may not be correctly detected.

Moreover, at the time of detecting the peak phase corresponding to a certain transmitting station (the first transmitting station, as one example), it is assumed that the reception field intensity of the signal from the first transmitting station is changed during the generation of delay profile. In this case, there is a possibility that the auto-correlation component of the signal from the first transmitting station or the other station will become larger than the original peak correlation value of the first transmitting station. In some cases, other erroneous peak phases are detected as the peak phase of the first transmitting station.

Still moreover, there is a case in which the timing of the peak correlation value of the second transmitting station matches the timing of an odd correlation component, that is, a negative auto-correlation component of the signal from the first transmitting station. In this case, the entire correlation value with this timing is observed as a small value, with the result that other erroneous peak phases are detected as the peak phase of the second transmitting station in some instances.

As mentioned above, for various kinds of factors resulting from the auto-correlation components of the spreading code, there is a possibility that the original peak phase will not be correctly detected as the peak value corresponding to each transmitting station. This reduces accuracy of obtainable demodulation data.

As a receiving apparatus for solving the aforementioned problem, an apparatus that is described in Unexamined Japanese Patent Application No. 10-51504 is known. This apparatus eliminates the correlation components of an interference station from the received signal using the technique of a decorrelater. However, there is a necessity to calculate the correlation component of the interference station from the received signal, causing the problem in which the number of calculations is increased.

DISCLOSURE OF INVENTION

It is an object of the present invention is to provide a receiving apparatus, which is capable of detecting an original peak phase corresponding to each transmitting station with a small number of calculations without being subjected to the auto-correlation component of a spreading code included in correlation values.

The auto-correlation component of a transmitting station in a delay profile is calculated using the auto-correlation value of the known spreading code, which is calculated beforehand, and the peak phase of the transmitting station to be demodulated is detected in consideration of the calculated auto-correlation component, thereby attaining the above object.

BEST MODE FOR CARRYING OUT THE INVENTION

Embodiments of the present invention will be specifically explained with reference to the accompanying drawings. The embodiments to be set forth below are divided into a first mode wherein a peak phase of a certain transmitting station is detected after eliminating a correlation component, which exerts an influence upon the detection of a peak correlation value of the transmitting station, from a delay profile and a second mode wherein a peak phase of a certain transmitting station is detected in consideration of a correlation component of the transmitting station or other transmitting station, which exerts an influence upon the detection of a peak correlation value of the transmitting station. The first embodiment corresponds to the first mode, and the second to fourth embodiments correspond to the second mode.

(First Embodiment)

Figure 1:
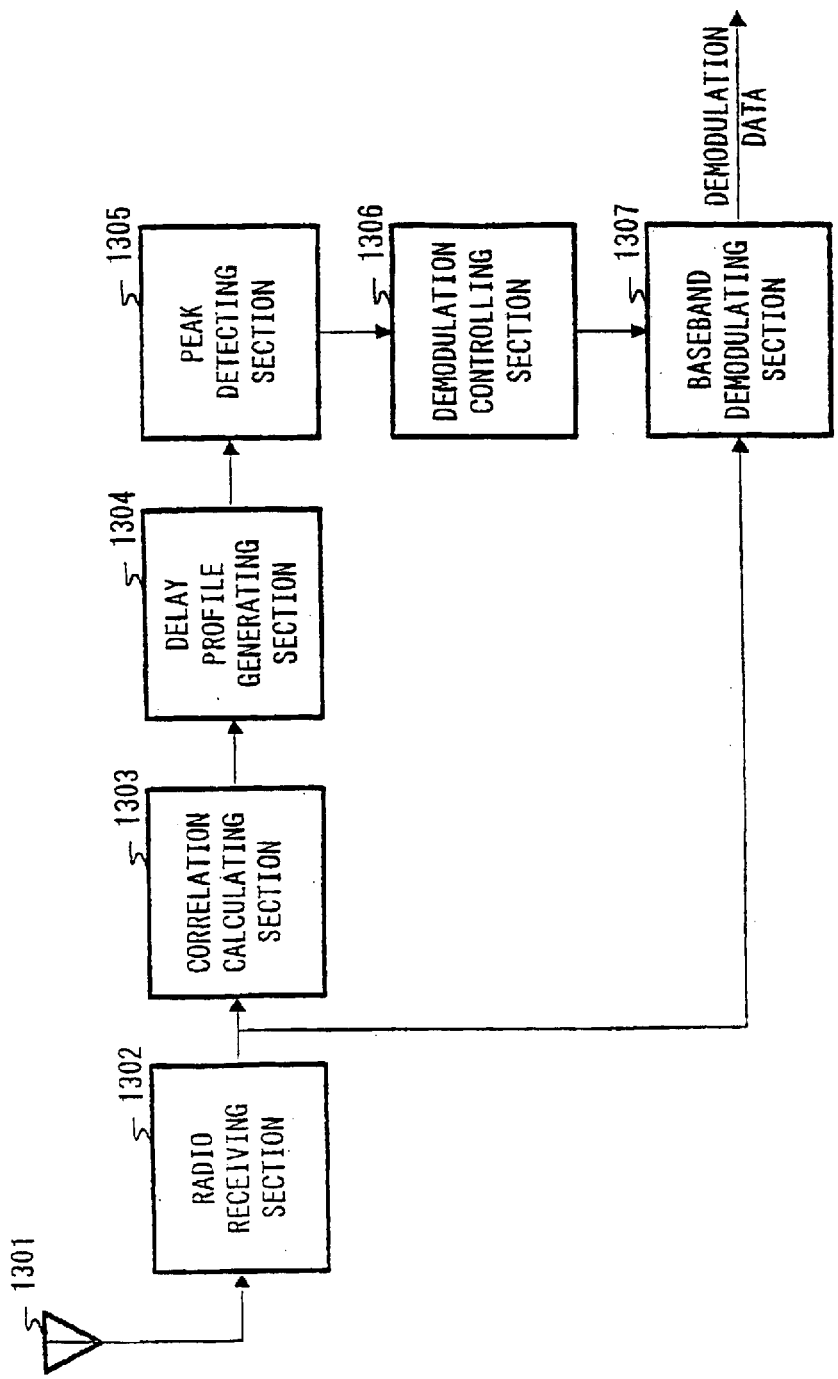
FIG. 1 is a block diagram showing a configuration of a conventional CDMA receiving apparatus.
Figure 2:
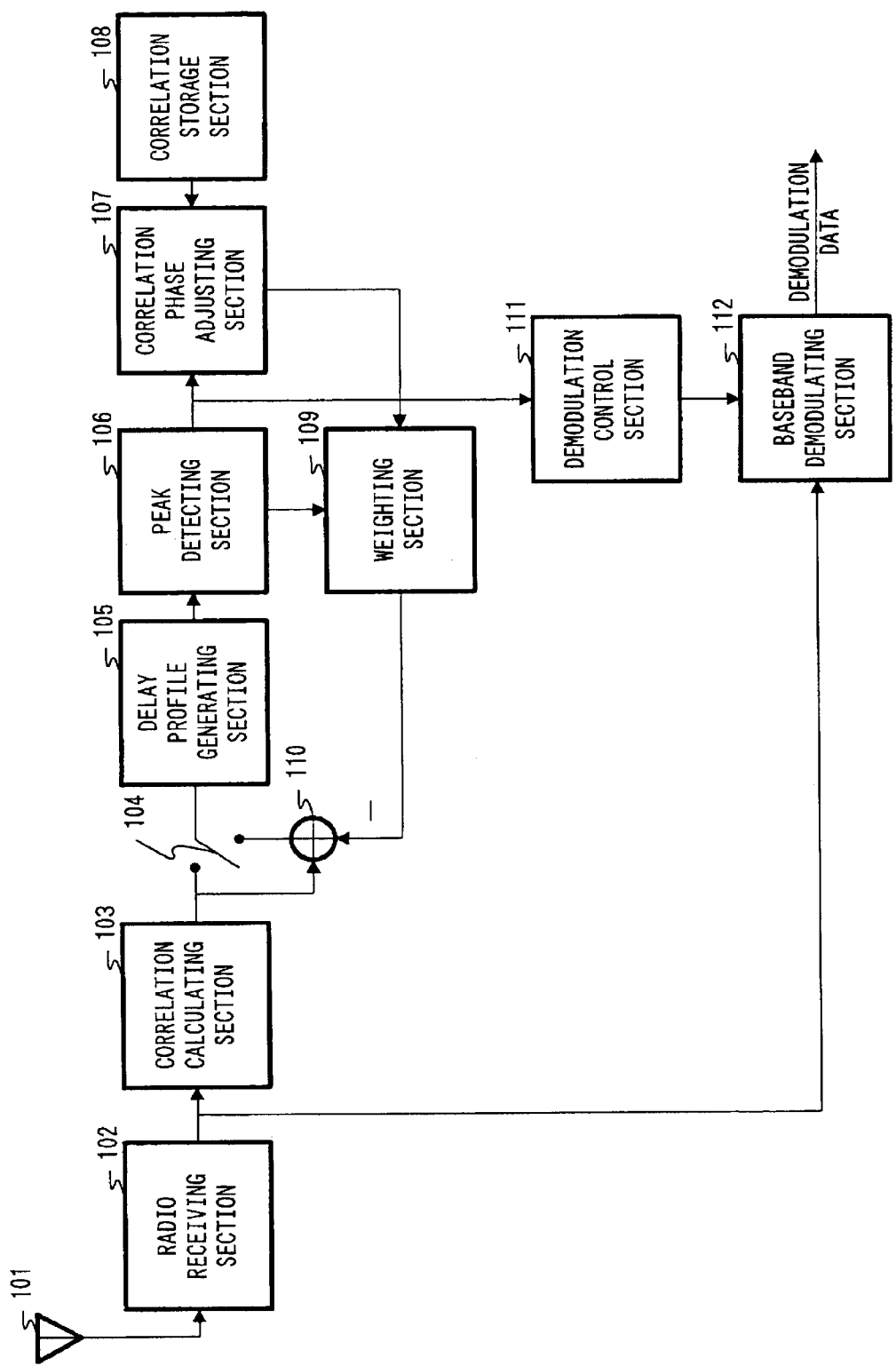
FIG. 2 is a block diagram showing a configuration of a receiving apparatus according to the first embodiment of the present invention.

FIG. 2 is a block diagram showing the configuration of the receiving apparatus according to the first embodiment of the present invention. In FIG. 2, a radio receiving section 102 converts signals received via an antenna 101 to received baseband signals, and outputs the received baseband signals to a correlation calculating section 103 and a baseband demodulating section 112. In this case, 110 the signals received via the antenna 101 are those that are obtained by multiplexing the signals transmitted from a plurality of transmitting stations into the same frequency band.

The correlation calculating section 103 multiplies the received signals by the known spreading code as shifting the phase of the received baseband signals, and calculates correlation values of the respective phases. As correlation calculating section 103, for example, a matched filer or a sliding correlator is used. In this case, the known spreading code is the same spreading code as used in a spread processing time at each transmitting station.

In order to suppress noise components included in the correlation values sent from the correlation calculating section 103 or a correlation eliminating section 110 via a selecting section 104, a delay profile generating section 105 generates a delay profile after providing average processing to the correlation values. Then, the delay profile generating section 105 outputs the generated delay profile to a peak detecting section 106.

The peak detecting section 106 detects a maximum value (hereinafter referred to as peak correlation value) of the correlation values averaged in the delay profile sent via the selecting section 104, and also detects a phase (hereinafter referred to as "peak phase") of the detected peak correlation values of the delay profile. It should be noted that a baseband demodulating section 112 to be described later provides despread processing to the received baseband signals in accordance with the peak phase thus detected, making it possible to demodulate the signals transmitted from the respective transmitting stations. Furthermore, the peak detecting section 106 outputs the detected peak phase to a correlation phase adjusting section 107 and a demodulation control section 111, and also outputs the detected peak correlation value to a weighting section 109.

A correlation storage section 108 stores spreading code auto-correlation values beforehand, and outputs the stored spreading code auto-correlation values to the correlation phase adjusting section 107. The spreading code auto-correlation values are those that are obtained by multiplying the known spreading code by the phase of the known spreading code as being shifted to calculate the correlation value for each phase.

The correlation phase adjusting section 107 adjusts the phases of the spreading code auto-correlation values sent from the correlation storage section 108 using the peak phase sent from the peak detecting section 106, and outputs the spreading code auto-correlation values subjected to the phase adjustment to the weighting section 109.

The weighting section 109 adjusts amplitude of the correlation values in the spreading code auto-correlation values subjected to the phase adjustment sent from the correlation phase adjusting section 107 by use of the peak correlation value sent from the peak detecting section 106. Then, the weighting section 109 outputs the spreading code auto-correlation values subjected to the phase adjustment to the correlation eliminating section 110. The correlation eliminating section 110 performs a subtraction between the correlation values sent from the correlation calculating section 103 and the spreading code auto-correlation values subjected to the amplitude adjustment sent from the weighting section 109. Then, the correlation eliminating section 110 outputs the subtraction result.

The demodulation control section 111 stores the peak phase sent from the peak detecting section 106, and outputs a timing signal for demodulating the signals sent from the respective transmitting stations, and outputs it to the baseband demodulating section 112. The baseband demodulating section 112 provides despread processing to the received baseband signals sent from the radio receiving section 102 to output demodulation data corresponding to each transmitting station based on the timing signal sent from the demodulation control section 111.

In this embodiment, before detecting the peak correlation value of a certain transmitting station, the auto-correlation component of a transmitting station in which the peak correlation value and peak phase are already detected is eliminated from the correlation value calculated by the correlation calculating section. Resultantly, the original peak correlation value of the transmitting station whose reception field intensity is low has the maximum correlation value in connection with the correlation values calculated by the correlation calculating section. This makes it possible to detect the original peak correlation value and peak phase, which correspond to the transmitting station.

An explanation will be next given of the operation of the above-structured receiving apparatus with reference to FIG. 3 in addition to FIG. 2. FIG. 3 is a schematic view showing the content of processing provided to the correlation values from the correlation calculating section in the receiving apparatus according to the first embodiment of the present invention. Though the following will explain, as one example, the case of detecting the peak phase corresponding to the second transmitting station having reception field intensity lower than that of the first transmitting station, the present invention can detect the peak phase corresponding to the other transmitting station.

First, in FIG. 2, the signals transmitted from the respective transmitting stations are received via the antenna 101, and then outputted to the radio receiving section 102. The radio receiving section 102 converts the signals received via the antenna 101 to received baseband signals. The received baseband signals are outputted to the correlation calculating section 103. The correlation calculating section 103 provides despread processing using the same known spreading code as used in spread processing at the transmitting station, and calculates the correlation value for each phase.

The correlation values are input to the delay profile generating section 105 from the correlation calculating section 103 or the correlation eliminating section 110 via the selecting section 104. First, the correlation values calculated by the correlation calculating section 103 are inputted to the delay profile generating section 105 by the selecting section 104.

In the delay profile generating section 105, the above correlation values are subjected to average processing to suppress noise components contained in the correlation values outputted from the correlation calculating section 103, thereby a delay profile is generated. The generated delay profile is outputted to the peak detecting section 106.

The peak detecting section 106 detects a peak correlation value and a peak phase in the delay profile outputted from the delay profile generating section 105. The peak correlation value and peak phase detected at this time will be explained with reference to FIG. 3A.

Figure 3A:
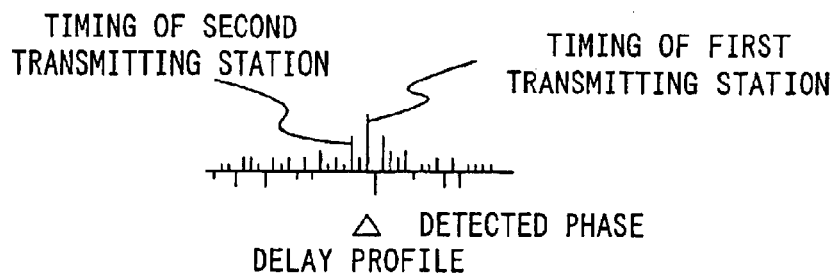
FIG. 3A is a schematic view showing one example of a delay profile generated by a delay profile generating section 105 of the receiving apparatus according to the first embodiment.

FIG. 3A is a schematic view showing one example of the delay profile generated by the delay profile generating section 105 of the receiving apparatus according to the first embodiment. As shown in FIG. 3A, there exists the correlation value averaged for each phase. Hereinafter, it is assumed that the original peak correlation value corresponding to each of the first and second transmitting stations appears in the phase as shown in FIG. 3A.

The peak detecting section 106 detects the correlation value, which corresponds to the first transmitting station and which is the maximum value, as the peak correlation value in the delay profile shown in FIG. 3A. Then, the phase of this peak correlation value is detected as the peak phase. The peak phase corresponding to the first transmitting station is outputted to the correlation phase adjusting section 107 and the demodulation control section 111. The peak correlation value corresponding to the first transmitting station is outputted to the weighting section 109.

Figure 3B:
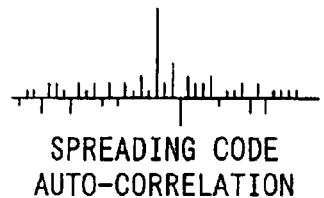
FIG. 3B is a schematic view showing a spreading code auto-correlation value stored by a correlation storage section 108 of the receiving apparatus according to the first embodiment.

Thereafter, a spreading code auto-correlation value is outputted to the correlation phase adjusting section 107 from the correlation storage section 108. The spreading code auto-correlation value will be explained with reference to FIG. 3B. FIG. 3B is a schematic view showing the spreading code auto-correlation value stored by the correlation storage section 108 of the receiving apparatus according to the first embodiment.

The spreading code auto-correlation value is a collection of the correlation values for the respective phases, which are obtained by multiplying the known spreading code and the spreading code, which is the same as the known spreading code, as shifting the phase. Namely, the delay profile is obtained by providing despread processing to the received signals containing only a signal sent from a certain transmitting station by use of the known spreading code. The delay profile thus obtained is equivalent to the delay profile in which amplitude and phase of each correlation value in the spreading code auto-correlation value are changed.

Figure 3C:
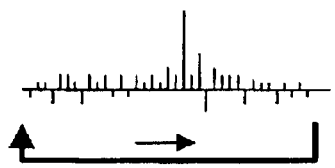
FIG. 3C is a schematic view showing a spreading code auto-correlation value subjected to phase adjustment by a correlation phase adjusting section 107 of the receiving apparatus according to the first embodiment.

In the correlation phase adjusting section 107, the spreading code auto-correlation values sent from the correlation storage section 108 are subjected to phase adjustment using the peak phase, which is sent from the peak detecting section 106 and which corresponds to the first transmitting station. The phase adjustment at this time will be explained with reference to FIG. 3C. FIG. 3C is a schematic view showing the spreading code auto-correlation value subjected to phase adjustment by the correlation phase adjusting section 107 of the receiving apparatus according to the first embodiment.

Namely, the phases of the spreading code auto-correlation values shown in FIG. 3B are adjusted such that the phase of the maximum correlation value in this spreading code auto-correlation values matches the peak phase corresponding to the first transmitting station shown in FIG. 3A. This adjustment changes the phases of the spreading code auto-correlation values shown in FIG. 3B as shown in FIG. 3C. Since the auto-correlation function is repeated with a cycle when the spreading code is used, the spreading code auto-correlation values are subjected to the phase adjustment by being circulated in an arrow direction shown in FIG. 3C. The spreading code auto-correlation values subjected to the phase adjustment are outputted to the weighting section 109.

Figure 3D:
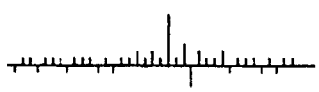
FIG. 3D is a schematic view showing a spreading code auto-correlation value subjected to amplitude adjustment by a weighting section 109 of the receiving apparatus according to the first embodiment.

The weighting section 109 provides amplitude adjustment to the spreading code auto-correlation value subjected to the phase adjustment sent from the correlation phase adjusting section 107 by use of the peak correlation value, which is sent from the peak detecting section 106 and which corresponds to the first transmitting station. The amplitude adjustment at this time will be explained with reference to FIG. 3D. FIG. 3D is a schematic view showing the spreading code auto-correlation values subjected to amplitude adjustment by the weighting section 109 of the receiving apparatus according to the first embodiment.

First, the maximum correlation value in the spreading code auto-correlation values is subjected to amplitude adjustment to be equal to the peak correlation value, which is sent from the peak detecting section 106 and which corresponds to the first transmitting station.

Moreover, the correlation values other than the maximum value in the spreading code auto-correlation value are subjected to amplitude adjustment based on the ratio in value between the maximum value and the peak correlation value corresponding to the first transmitting station. In other words, the correlation values other than the maximum value are reduced or increased by the ratio at which the maximum value is reduced or increased.

The spreading code auto-correlation values subjected to the phase adjustment shown in FIG. 3C are changed as shown in FIG. 3D by this adjustment. It can be said that the spreading code auto-correlation values thus obtained are equivalent to the fact as follows. That is, auto-correlation components of the first transmitting station, which are included in the delay profile generated by the delay profile generating section 105, are produced in a quasi-manner. The auto-correlation components of the first transmitting station are the correlation values, which are obtained when despread processing is provided to the received signals sent from only the first transmitting station using the known spreading code. The spreading code auto-correlation values subjected to amplitude adjustment are outputted to the correlation eliminating section 110.

The correlation eliminating section 110 performs a subtraction between the correlation values sent from the correlation calculating section and the spreading code auto-correlation values subjected to the amplitude adjustment sent from the weighting section. Namely, the spreading code auto-correlation values subjected to amplitude adjustment are subtracted from the correlation values sent from the correlation calculating section. This makes it possible to eliminate the auto-correlation components of the signal from the detected transmitting station, that is, the first transmitting station, from the correlation values calculated by the correlation calculating section 103. The subtraction result at this time will be explained with reference to FIG. 3E.

Figure 3E:
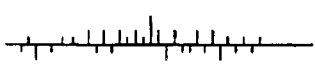
FIG. 3E is a schematic view showing a delay profile in which the auto-correlation component of a first transmitting station is eliminated by a correlation eliminating section 110 of the receiving apparatus according to the first embodiment.

FIG. 3E is a schematic view showing a delay profile in which the auto-correlation components of the first transmitting station are eliminated by the correlation eliminating section 110 of the receiving apparatus according to the first embodiment. The spreading code auto-correlation values subjected to the amplitude adjustment shown in FIG. 3D are subtracted from the delay profile shown in FIG. 3A. This obtains the delay profile in which the auto-correlation components of the first transmitting station are eliminated as shown in FIG. 3E.

This makes it clear that the correlation value other than the peak correlation value of the second transmitting station exists as the highest correlation value next to the peak correlation value of the first transmitting station in the correlation values of the delay profile before eliminating the auto-correlation component of the first transmitting station as shown in FIG. 3A. While, in the correlation values of the delay profile after eliminating the auto-correlation components of the first transmitting station as shown in FIG. 3E, the peak correlation value of the second transmitting station becomes a maximum value. In other words, the auto-correlation components of the first transmitting station are prevented from being erroneously detected at the time of detecting the peak correlation value of the second transmitting station.

Next, in place of the correlation values calculated by the correlation values calculating section 103, the correlation values in which the auto-correlation components of the first transmitting station are eliminated by the correlation eliminating section 110 is outputted to the delay profile generating section 105 by the selecting section 104.

Thereafter, the peak detecting section 106 correctly detects the peak correlation value and peak phase corresponding to the second transmitting station. Then, the aforementioned processing is performed using the detection result. As a result, the auto-correlation components of the second transmitting station in addition to the first transmitting station are eliminated from the correlation values calculated by the correlation calculating section 103. The peak correlation value and peak phase corresponding to a certain transmitting station are detected in the same way afterward.

On the other hand, the demodulation control section 111 stores the peak phase corresponding to each detected transmitting station. All peak correlation values and peak phases corresponding to a certain transmitting stations are detected in this way. Thereafter, a timing signal for demodulating the signals transmitted from the respective transmitting stations are outputted to the baseband demodulating section 112 from the demodulation control section 111. In the baseband demodulating section 112, despread processing is provided to the received baseband signal from the radio receiving section 102 based on the timing signal from the demodulation control section 111, with the result that modulation data corresponding to each transmitting station can be obtained.

Figure 4:
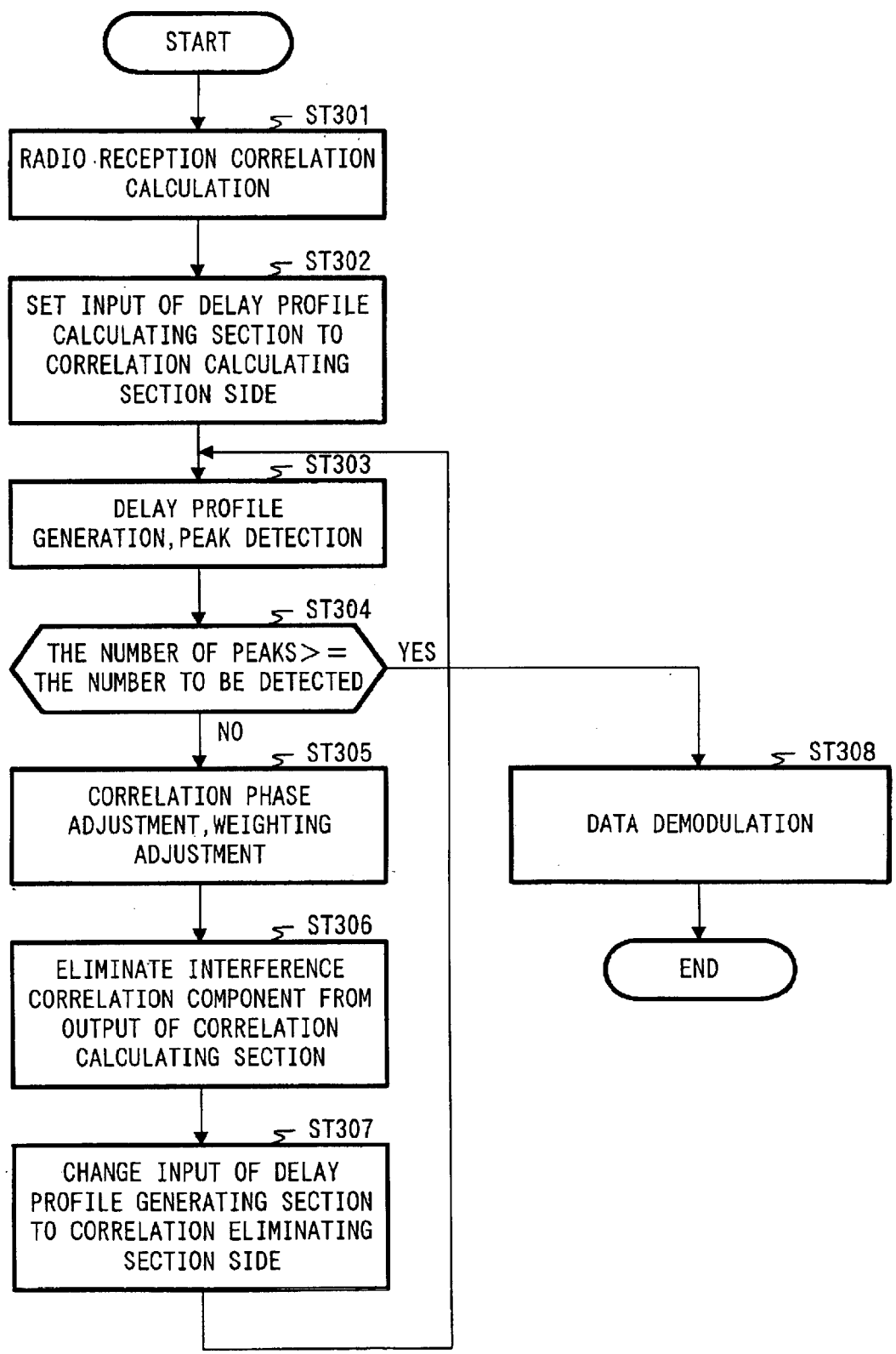
FIG. 4 is a flowchart showing a reception processing operation of the receiving apparatus according to the first embodiment.

The flow of the operation of the above-configured receiving apparatus will be next explained with reference to FIG. 4. FIG. 4 is a flowchart showing the reception processing operation of the receiving apparatus according to the first embodiment.

First, in step (hereinafter referred to as "ST") 301, the signals received via the antenna 102 are converted to received baseband signals. Moreover, a correlation between the received baseband signals and the known spreading code is obtained by the correlation calculating section 103. In ST302, the correlation values calculated by the correlation calculating section 102 are sent to the delay profile generating section 105 by the selecting section 104.

In ST303, the delay profile generating section 105 generates a delay profile. Thereafter, peak detecting section 106 detects the peak correlation value and peak phase in the delay profile. The detected peak phase is stored in the demodulation control section 111.

In ST304, it is confirmed whether or not the peak correlation values and peak phases, which correspond to all transmitting stations to be detected, are detected. The transmitting stations to be detected are given using, for example, the number, or the threshold value in a reception level value of the peak correlation value and the like. When the peak correlation values and peak phases, which correspond to all transmitting stations, are detected, processing goes to ST308. Conversely, when they are not detected, processing goes to ST305.

In ST305, the correlation phase adjusting section 107 provides phase adjustment to the spreading code auto-correlation values outputted from the correlation storage section 108 in accordance with the detected peak phase. Also, the weighting section 109 provides phase adjustment to the spreading code auto-correlation values subjected to the phase adjustment in accordance with the amplitude of the detected peak correlation value. Whereby, auto-correlation components of the detected transmitting station, which are included in the correlation values obtained by the correlation calculating section 103, are produced in a quasi-manner.

In ST306, the correlation eliminating section 110 eliminates the auto-correlation components of the detected transmitting station from the correlation values calculated by the correlation calculating section 103. In ST307, in place of the correlation values from the correlation calculating section 103, the correlation value from the correlation eliminating section 110 are sent to the delay profile generating section 105 by the selecting section 110.

Afterward, processing goes back to ST303 and the above-mentioned processing is repeated.

While, in ST308, a timing signal for demodulating the signals transmitted from the respective transmitting stations are outputted to the baseband demodulating section 112 from the demodulation control section 111. In the baseband demodulating section 112, despread processing is provided to the received baseband signal from the radio receiving section 102 based on the timing signal from the demodulation control section 111, with the result that modulation data corresponding to each transmitting station can be obtained.

Thus, even in a case where the reception field intensity of the signal from the second transmitting station is lower than that of the signal from the first transmitting station, the correlation value between the received signal from the first transmitting station and the spreading code is generated in a quasi-manner. Then, the correlation values generated in a quasi-manner are eliminated from the correlation values calculated by the correlation calculating section 103. This eliminates the auto-correlation components of the first transmitting station from the correlation values calculated by the correlation calculating section 103.

As a result, in the correlation values calculated by the correlation calculating section 103, the original peak correlation value corresponding to the second transmitting station becomes a maximum value as a correlation value. For this reason, the peak correlation value is detected by the peak detecting section 106. Therefore, the peak correlation value and peak phase corresponding to the second transmitting station are correctly detected.

Thus, according to this embodiment, even in a case where variations occur in the reception field intensity of the signals from the respective transmitting stations, the auto-correlation components of the detected transmitting station are generated in a quasi-manner using the auto-correlation values calculated beforehand using the known spreading code. Then, the generated auto-correlation components are eliminated from the correlation values of the delay profile. This makes it possible to correctly detect the peak phase with a small number of calculations in connection with the transmitting station whose reception field intensity is lower than that of the above-detected transmitting station.

(Second Embodiment)

According to the embodiment, in the delay profile generated by resulting from the variation in the reception field intensity of the signals from the respective transmitting stations, there exists a quasi-peak having a value larger than the original peak correlation value of each transmitting station. For this reason, the peak phase of the transmitting station is detected in consideration of the phase of the quasi-peak. Whereby, the signal from the transmitting station can be correctly demodulated even in a case where a quasi-peak is erroneously detected as a peak correlation value of the transmitting station. The following will explain the receiving apparatus of the second embodiment with reference to FIG. 5.

Figure 5:
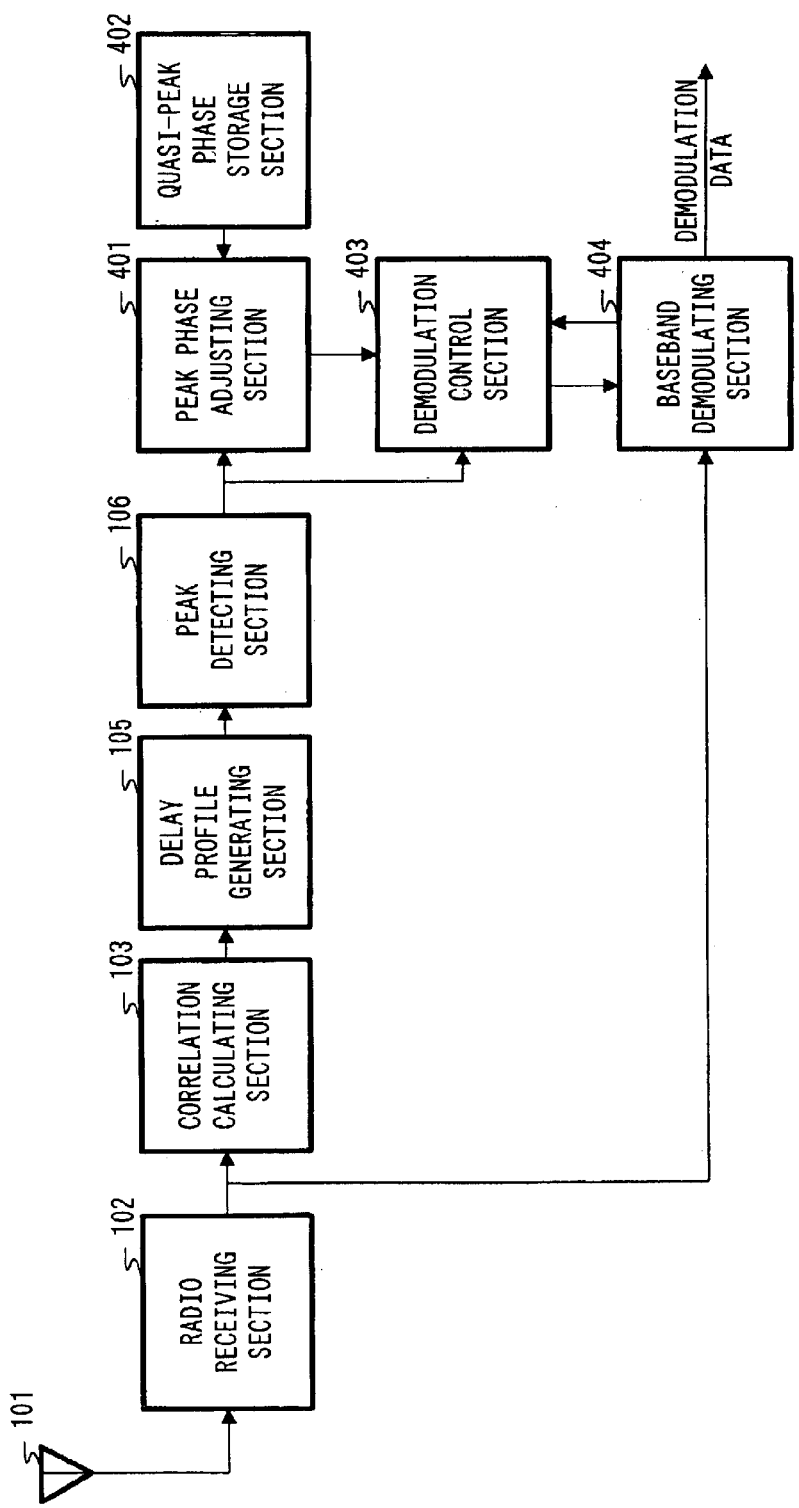
FIG. 5 is a block diagram showing a configuration of a receiving apparatus according to the second embodiment of the present invention.

FIG. 5 is a block diagram showing the configuration of the receiving apparatus according to the second embodiment of the present invention. In FIG. 5, regarding the configuration of each of the antenna 101, radio receiving section 102, correlation calculating section 103, delay profile generating section 105, and peak detecting section 106, they are the same as those of the first embodiment (FIG. 2), and the specific examination is omitted.

Regarding the phase (hereinafter referred to as "quasi-peak phase") corresponding to the quasi-peak having a large value in the despreading code auto-correlation values of the aforementioned first embodiment.

A quasi-peak phase storage section 402 stores a phase difference between the quasi-peak phase and the original peak correlation value. It should be noted that the spreading code auto-correlation values themselves are the same as those stored by the correlation storage section 108 of the aforementioned embodiment 1.

Namely, the quasi-peak phase storage section 402 sets a predetermined threshold value. Then, the quasi-peak phase storage section 402 stores the phase difference, as a quasi-peak phase, between the quasi-peak having the correlation value more than the threshold value and the original peak correlation value in the spreading code auto-correlation values. Beside the above, the quasi-peak phase storage section 402 may store only a predetermined number of the quasi-peak phases set in order of decreasing correlation value. The quasi-peak phase storage section 402 outputs the stored quasi-peak phases to a peak phase adjusting section 401.

The peak phase adjusting section 401 calculates a peak phases to be assumed as an original peak phase (hereinafter referred to as "candidate peak phase") based on the quasi-peak phases from the quasi-peak phase storage section 402 and the peak phases from the peak detecting section 106. Namely, the peak phase adjusting section 401 calculates the original peak phase as a candidate peak phase assuming that the peak phase from the peak detecting section 106 is a quasi-peak having a large correlation value of some degree. Moreover, the peak phase adjusting section 401 outputs the calculated candidate peak phase to the demodulation control section 403.

Figure 6:
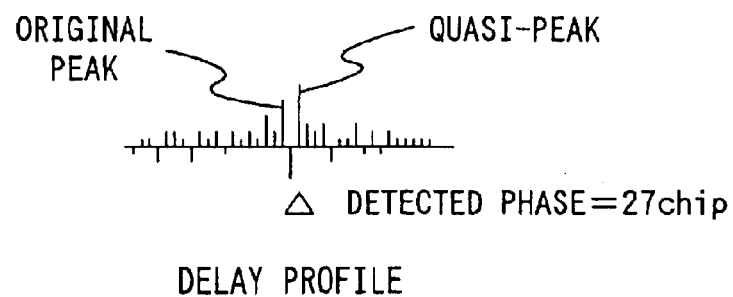
FIG. 6 is a schematic view showing one example of a delay profile generated by the receiving apparatus according to the second embodiment.

Herein, the method for calculating the candidate peak phase will be described with reference to FIG. 6. FIG. 6 is a schematic view showing one example of a delay profile generated by the receiving apparatus according to the second embodiment. In the delay profile shown in FIG. 6, there exists a quasi-peak, which is higher than the original peak correlation value corresponding to a certain transmitting station in the delay profile shown in FIG. 6.

The phase difference, as a quasi-peak phase, between the quasi-peak and the original peak correlation value shown in FIG. 6 is sent to the peak phase adjusting section 401 from the quasi-peak phase storage section 402. Here, it is assumed that the quasi-peak phase is +2 chip. The peak phase adjusting section 401 calculates the original peak phase, which is obtained when not the original peak correlation value but the quasi-peak is detected by the peak detecting section 106, as a candidate peak phase.

More specifically, for example, if the peak phase (detected phase), which is obtained when the quasi-peak shown in FIG. 6 is detected as a peak correlation value, is 27 chip, the calculation of 27−2=25 chip is established as a candidate peak phase. The peak phase adjusting section 401 outputs the candidate peak phase thus calculated to the demodulation control section 403. Regarding the respective quasi-peaks sent from the quasi-peak phase storage section 402, it is needless to say that the candidate peak phase is calculated and outputted to the demodulation control section 403.

The demodulation control section 403 stores the peak phases from the peak detecting section 106 and the candidate peak phases from the peak phase adjusting section 401. First, the demodulation control section 403 outputs a timing signal for demodulating the signal transmitted from the transmitting station, which corresponds to the peak phase, to a baseband demodulation section 404 based on the peak phases from the peak detecting section 106.

Thereafter, when the demodulation control section 403 receives the determination in which the demodulation result, which is based on the timing signal, is an error from the baseband demodulation section 404, the demodulation control section 403 judges that the peak phase has been the quasi-peak and outputs the timing signal, which is based on the candidate peak phase, to the baseband modulation section 404. Moreover, the demodulation control section 403 outputs the timing signal, which is based on the other candidate peak phase, to the baseband modulation section 404 when receiving the same determination as mentioned above from the baseband demodulation section 404.

The baseband demodulation section 404 provides despread processing to the received baseband signal sent from the radio receiving section 102 based on the timing signal sent from the demodulation control section 403, whereby outputting demodulation data corresponding to each transmitting station. At this time, the baseband demodulation section 404 determines the correctness/error of the demodulation result and outputs the determination result to the demodulation control section 403.

The operation of the above-configured receiving apparatus will be next described with reference to FIG. 7.

Figure 7:
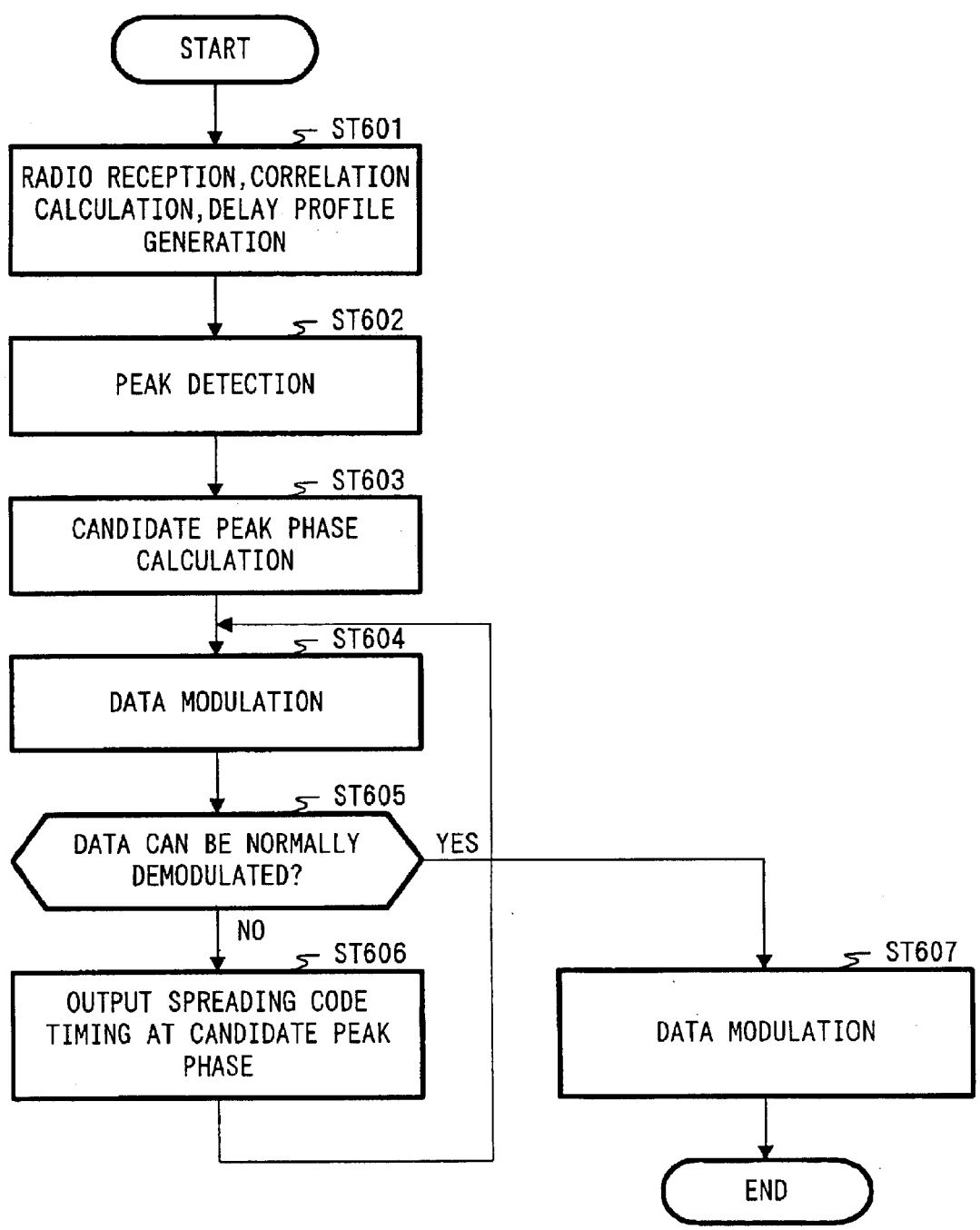
FIG. 7 is a flowchart showing a reception processing operation of the receiving apparatus according to the second embodiment.

FIG. 7 is a flowchart showing a reception processing operation of the receiving apparatus according to the second embodiment.

First, in ST601, the signals received via the antenna 101 are converted to baseband signals. Moreover, the correlation calculating section 103 obtains the correlation between the received baseband signal and the known spreading code. Also, the delay profile generating section 105 generates a delay profile. In ST602, the peak detecting section 106 detects peak phases in the delay profile. The detected peak phases are stored in the demodulation control section 403.

In ST603, the peak phase adjusting section 401 calculates a candidate peak phase using the quasi-peak phases sent from the quasi-peak phase storage section 402.

In ST604, the demodulation control section 403 outputs a timing signal, which is based on the peak phase from the peak detecting section 106, to the baseband demodulation section 404. The baseband demodulation section 404 demodulates the received baseband signal sent from the radio receiving section 102 based on the timing signal sent from the demodulation control section 402. Thereafter, the demodulation result is outputted to the demodulation control section 403 from the baseband demodulation section 404.

In ST605, the demodulation control section 403 performs the determination of the demodulation result from the baseband demodulation section 404. When the demodulation result is correct, processing goes to ST607. Conversely, when the demodulation result is incorrect, processing goes to ST606.

In ST606, the demodulation control section 403 outputs the timing signal to the baseband demodulation section 404 again. The timing signal at this time is a signal, which is obtained based on the candidate peak phase sent from the peak phase adjusting section 401. The baseband demodulation section 205 demodulates the received baseband signal based on the timing signal obtained at the candidate peak phase. After the demodulation, the demodulation result is outputted to the demodulation control section 403 from the baseband demodulation section 205. After that, processing goes back to ST604.

In ST607, the demodulation control section 403 determines that the peak phase, which corresponds to the transmitting station to be subjected to demodulation by the baseband demodulation section 404, has been correctly detected. Therefore, the baseband demodulation section 404 continues to perform demodulation processing to the received baseband signal.

Thus, according to this embodiment, there is a case that a quasi-peak, which has a value more than the original peak correlation value of a certain transmitting station, exists due to variations in the reception field intensity of the signal from the transmitting station at the delay profile generating time. Even in such a case, the phase difference between the quasi-peak phase with a correlation value of some degree and the original peak correlation value based on the spreading code auto-correlation value stored beforehand. The candidate peak phase is calculated using this phase difference. Moreover, by referring to the demodulation result based on the timing signal obtained by the detected peak phase and the candidate peak phase, it is possible to correctly detect the original correlation value peak of the transmitting station.

Furthermore, the correlation storage section 108 in the aforementioned first embodiment must store the spread code auto-correlation values, while the quasi-peak phase storage section 402 in this embodiment stores only the phase of the quasi-peak in the spread code auto-correlation value. In this embodiment, it is possible to suppress the necessary memory quantity as compared with the first embodiment.

(Third Embodiment)

According to this embodiment, even in a case where variations occur in reception field intensity of the signals from the respective transmitting stations, the peak phase of a certain transmitting station can be correctly detected as considering the phases of the correlation components of the other transmitting station with high reception field intensity, which exerts an influence upon the detection of the peak correlation value of the transmitting station. The following will explain the receiving apparatus according to the third embodiment with reference to FIG. 8.

Figure 8:
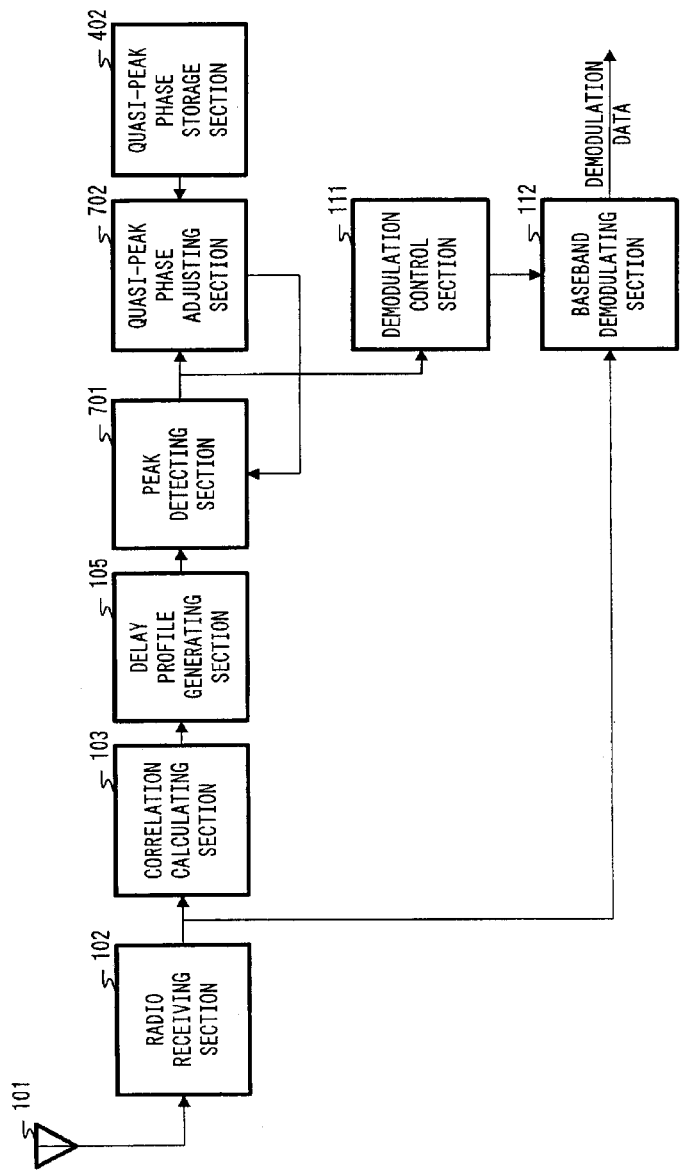
FIG. 8 is a block diagram showing a configuration of a receiving apparatus according to the third embodiment of the present invention.

FIG. 8 is a block diagram showing the configuration of the receiving apparatus according to the third embodiment of the present invention. In FIG. 8, regarding the configuration of each of the antenna 101, radio receiving section 102, correlation calculating section 103, delay profile generating section 105, demodulation control section 111 and baseband demodulation section 112, they are the same as those of the first embodiment (FIG. 2). Moreover, the quasi-peak phase storage section 402 is the same as that of the second embodiment (FIG. 5), and the specific examination is omitted.

A peak detecting section 701 detects peak phases in the delay profile sent from the delay profile generating section 105, and outputs the detection result to a quasi-peak phase adjusting section 702 and a demodulation control section 111. However, the peak detecting section 701 does not detect the peak phases subjected to the detection by the previous processing again. Namely, the peak detecting section 701 detects the peak phases other than the detected peak phases sent from the quasi-peak phase adjusting section 702.

The quasi-peak phase adjusting section 702 calculates the quasi-peak of the transmitting station corresponding to the above-detected peak phase using the peak phases detected by the peak detecting section 701 and the quasi-peaks from the quasi-peak phase storage section 402. Herein, the method for calculating the quasi-peak using the quasi-peak phase adjusting section 702 will be explained with reference to FIG. 9.

Figure 9A:
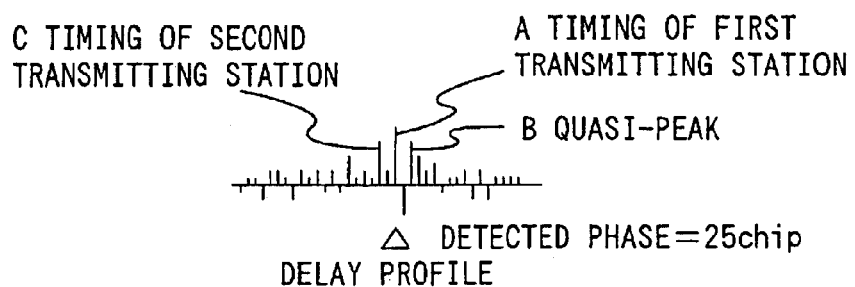
FIG. 9A is a schematic view showing one example of a delay profile generated by a delay profile generating section of the receiving apparatus according to the third embodiment.
Figure 9B:
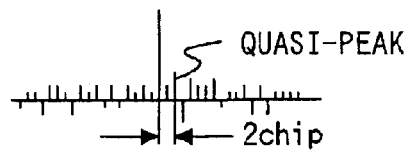
FIG. 9B is a schematic view showing the content of a spreading code auto-correlation value stored by a quasi-peak phase storage section of the receiving apparatus according to the third embodiment.
Figure 9C:
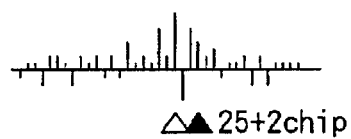
FIG. 9C is a schematic view showing a method for calculating the quasi-peak phase using a quasi-peak phase adjusting section of the receiving apparatus according to the third embodiment.

FIG. 9A is a schematic view showing one example of the delay profile generated by the delay profile generating section 105 of the receiving apparatus according to the third embodiment. FIG. 9B is a schematic view showing the content of the spreading code auto-correlation value stored by the quasi-peak phase storage section 402 of the receiving apparatus according to the third embodiment. FIG. 9C is a schematic view showing a method for calculating the quasi-peak phase using the quasi-peak phase adjusting section 702 of the receiving apparatus according to the third embodiment.

When the delay profile as shown in FIG. 9A is generated by the delay profile generating section 105, the peak corre-lation value at phase C corresponding to the second transmitting station should be primarily detected as a peak correlation value after detecting the peak correlation value at phase A corresponding to the first transmitting station.

However, since the reception field intensity of the signal from the second transmitting station is lower than that of the signal from the first transmitting station, the original peak correlation value of the second transmitting station becomes smaller than the auto-correlation component of the signal from the first transmitting station, that is, the quasi-peak at phase B shown in FIG. 9A. For this reason, the quasi-peak at phase B is detected after detecting the peak correlation value corresponding to the first transmitting station.

Here, first, according to this embodiment, the quasi-peak phase storage section 402 outputs the quasi-peak phase of the spreading code auto-correlation value to the quasi-peak phase adjusting section 702 as shown in FIG. 9B. FIG. 9B shows one example in which the quasi-peak phase of the quasi-peak shown in FIG. 9A is calculated as 2 chip.

Moreover, the quasi-peak phase adjusting section 702 calculates the phases of the auto-correlation components (quasi-peaks) of the signal from the first transmitting station in the delay profile using the peak correlation values detected by the peak detecting section 701 and the quasi-peak phases from the quasi-peak phase storage section 402. For example, when the peak phase of the first transmitting station shown in FIG. 9A is detected as 25 chip by the peak detecting section 701, the peak phase shown in FIG. 9A is calculated as 25+2 chip as shown in FIG. 9C.

After detecting the peak phase of the first transmitting station, the correlation value at the phase of the quasi-peak thus calculated is designed not to be detected. Whereby, the peak phase of the second transmitting station can be next detected. The above has explained the method for calculating the quasi-peak using the quasi-peak phase adjusting section 702.

The quasi-peak phase adjusting section 702 outputs the peak phase detected by the peak detecting section 701 and the phase of the calculated quasi-peak to the peak detecting section 701. The peak detecting section 701 does not detect the detected peak correlation value of the transmitting station and the quasi-peak of the signal from the transmitting station as the peak correlation value at a next peak detecting time.

Figure 10:
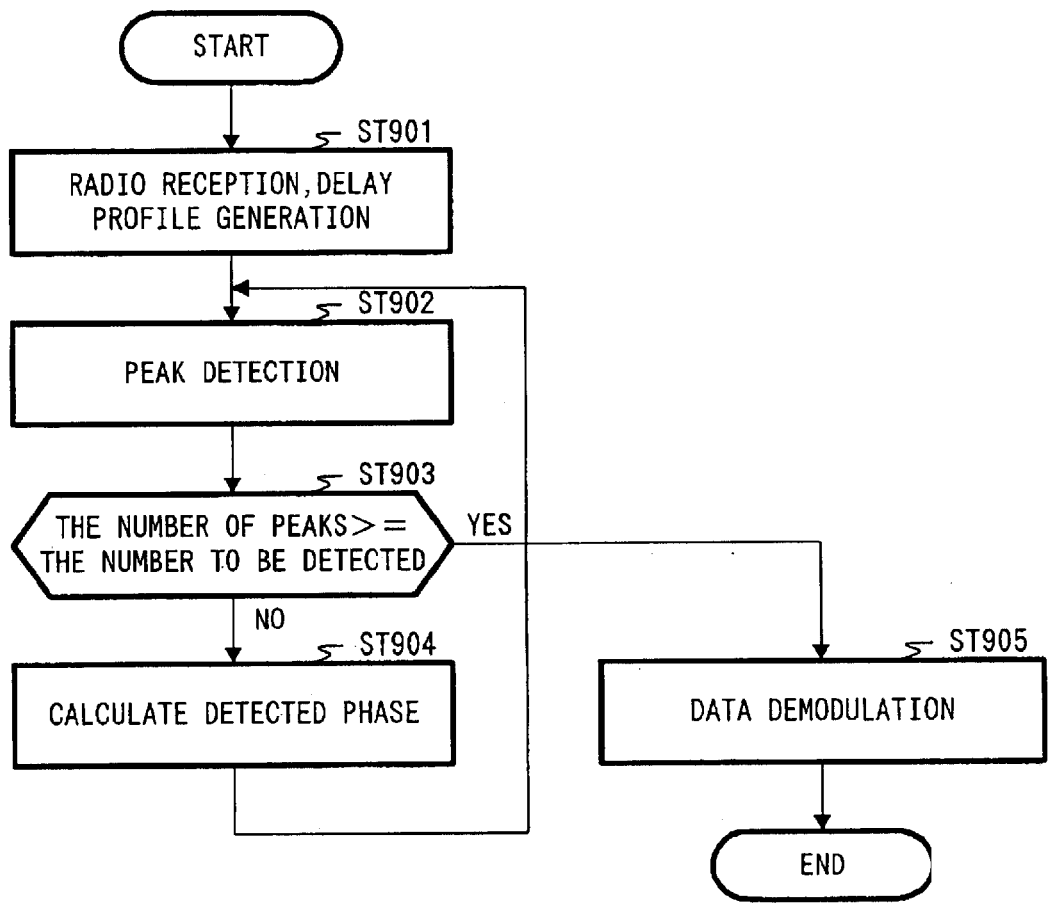
FIG. 10 is a flowchart showing a reception processing operation of the receiving apparatus according to the third embodiment.

The operation of the above-configured receiving apparatus will be next explained using the flowchart of FIG. 10. FIG. 10 is a flowchart showing a reception processing operation of the receiving apparatus according to the third embodiment.

First, in ST901, the signals received via the antenna 101 are converted to baseband signals by the radio receiving section 102. Moreover, the correlation between the received baseband signal and the known spreading code is obtained by the correlation calculating section 103. Also, the delay profile is generated by the delay profile generating section 105.

In ST902, the peak detecting section 701 detects the peak phase in the delay profile. At a first detecting time, since the peak phases, which are already detected, are inputted, a simple detection for a maximum value is performed. At second detecting time and afterward, since the peak phases, which are already detected, are inputted, the maximum value, except for the correlation value at the phase, is detected. The detected peak phases are stored in the demodulation control section 111.

In ST903, it is conformed whether or not the peak correlation values and the peak phases, which correspond to all transmitting stations to be detected, are detected. The transmitting stations to be detected are given using, for example, the number, or the threshold value in a reception level value of the peak correlation value and the like. When the peak correlation values and peak phases, which correspond to all transmitting stations, are detected, processing goes to ST905. Conversely, when they are not detected, processing goes to ST904.

In ST904, the quasi-peak phase adjusting section 702 calculates the quasi-peak phase in accordance with the detected peak phase. Moreover, the quasi-peak phase adjusting section 702 outputs the above peak phase and quasi-peak phase to the peak detecting section 701 as the detected phases. After that, processing goes to ST902.

In ST905, the demodulation control section 111 outputs a timing signal for demodulating the signals from the respective transmitting stations to the baseband demodulation section 112. The baseband demodulation section 112 provides despread processing to the received baseband signal from the radio receiving section 102 based on the timing signal from the demodulation control section 111. This obtains demodulation data corresponding to each transmitting station.

Thus, even in a case where the reception field intensity of the signal from the second transmitting station is lower that that of the signal from the first transmitting station, the peak phase corresponding to the first transmitting station is detected. After that, the phase in which the auto-correlation value of the signal from the first transmitting station increases is calculated. Then, at the time of detecting the peak phase corresponding to the second transmitting station, the calculated phase is excluded to carry out the detection. Whereby, the original peak correlation value of the second transmitting station is correctly detected even if it is small.

Moreover, the quasi-peak phase storage section 402 in this embodiment stores only the phase of the quasi-peak in the spread code auto-correlation values similar to the second embodiment. For this reason, in this embodiment, it is possible to suppress the necessary memory quantity as compared with the first embodiment.

Thus, according to this embodiment, even in a case where variations occur in reception field intensity of the signals from the respective transmitting stations, the phase of the quasi-peak of the signal from the detected transmitting station is calculated using the auto-correlation value calculated beforehand by use of the known spreading code. Then, at the next peak phase detecting time and afterward, the peak phase except for the calculated phase is detected. This makes it possible to detect the peak phase with a small number of calculations with respect to the transmitting station whose reception field intensity is lower than that of the detected transmitting station.

(Fourth Embodiment)

According to this embodiment, the original peak phase of a certain transmitting station matches the phase of an odd correlation component with a large correlation value of the signal from the other transmitting station. Whereby, even in a case where the entire correlation value in this phase becomes small, the original peak phase of the transmitting station can be detected in consideration of the odd correlation component of the other transmitting station. The following will explain the receiving apparatus according to the fourth embodiment with reference to FIG. 11.

It is assumed that an odd correlation component with a large value is included in the correlation components of an other transmitting station and that the phase of the odd correlation component matches the peak phase of a certain transmitting station. In this case, since the correlation value of the transmitting station at this phase in the delay profile becomes small, there is a possibility that the peak phase of the transmitting station will not be correctly detected.

Figure 11:
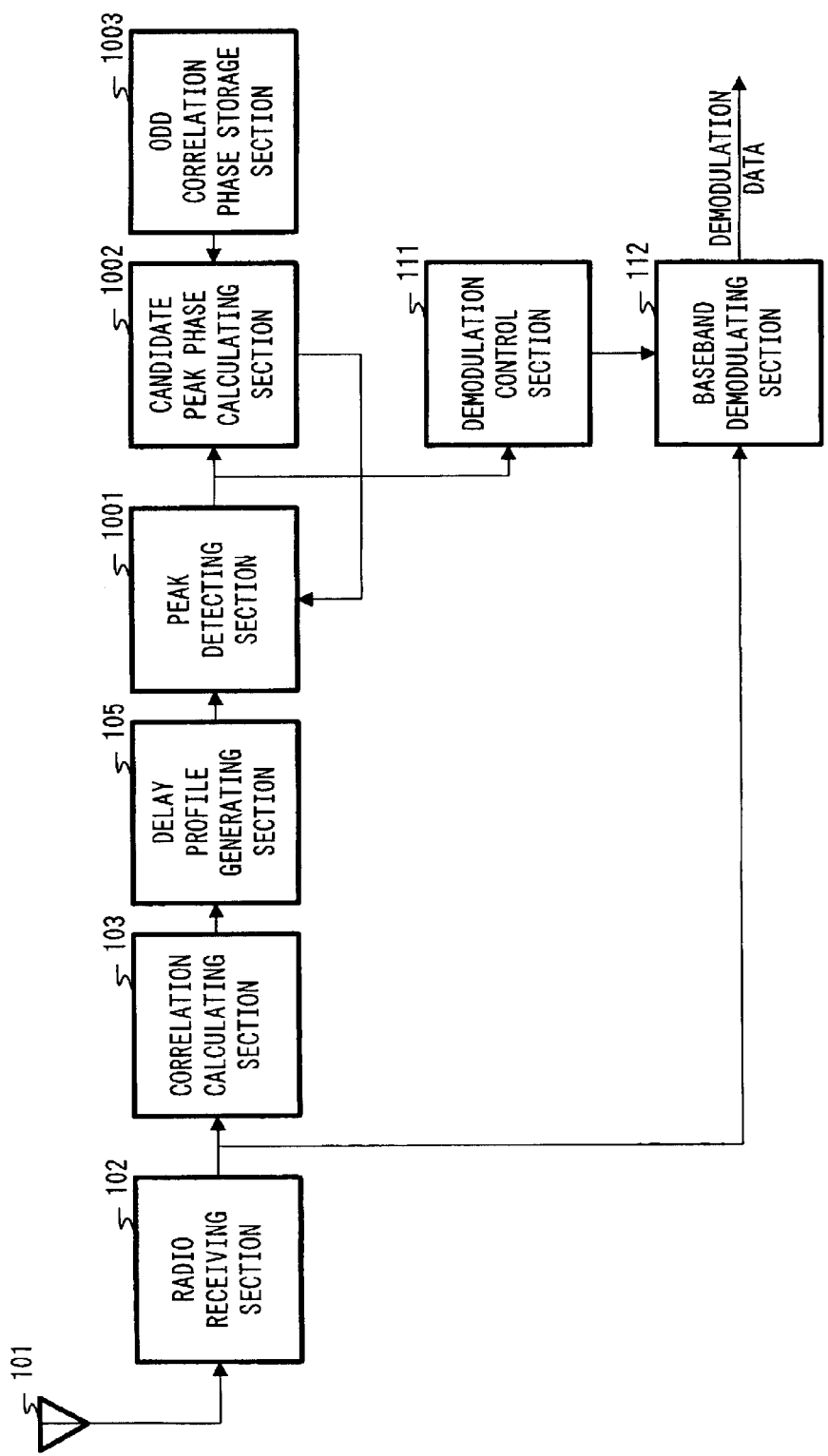
FIG. 11 is a block diagram showing a configuration of a receiving apparatus according to the fourth embodiment of the present invention.

For this reason, according to this embodiment, first, the phase of the odd correlation component in the spreading code auto-correlation value is stored, and the phase of the odd correlation component is adjusted in accordance with the peak phase of the detected transmitting station. Whereby, the phase of the odd correlation component of the detected transmitting station in the delay profile is calculated. Thereafter, when the correlation value at the phase in the delay profile exceeds the threshold value, this phase is detected as a peak phase of the transmitting station. FIG. 11 is a block diagram showing the configuration of the receiving apparatus according to the fourth embodiment of the present invention. In FIG. 11, regarding the configuration of each of the antenna 101, radio receiving section 102, correlation calculating section 103, delay profile generating section 105, demodulation control section 111 and baseband demodulation section 112, they are the same as those of the first embodiment (FIG. 2) and the specific examination is omitted.

A peak detecting section 1001 inputs a candidate peak phase to be described later from a candidate peak phase calculating section 1002. Also, in the delay profile sent from the delay profile generating section 105, the peak detecting section 1001 detects a peak phase and outputs it to the quasi-peak phase calculating section 1002 and the modulation control section 111. Moreover, if the correlation value at the inputted candidate peak phase has a value of some degree though it is not always the maximum value in the correlation value of the delay profile, the peak detecting section 1001 outputs the candidate peak phase to the quasi-peak phase calculating section 1002 as a peak phase.

At this time, as to whether or not the candidate peak phase is selected as a peak phase, for example, a threshold value, which is larger by 3 dB than the average value of the correlation values in the delay profile. Then, a candidate peak phase, which exceeds this threshold value, may be determined as a peak phase.

An odd correlation phase storage section 1003 stores a phase of an odd correlation value in the spreading code auto-correlation value of the aforementioned first embodiment. In other words, it stores a phase of a correlation value whose negative absolute value is large as an odd correlation phase. The spreading code auto-correlation values themselves are the same as those stored by the correlation storage section 108 of the aforementioned first embodiment. As phases to be stored, for example, a certain threshold value is set and phases, each having a correlation value lower than the threshold value, may be stored. Beside the above, the odd correlation phase storage section 1003 may store only a predetermined number of odd correlation phases set in order of increasing the correlation values in the spreading code auto-correlation value. The odd correlation phase storage section 1003 outputs the stored odd correlation phases to the candidate peak phase calculating section 1002.

The candidate peak phase calculating section 1002 calculates a candidate peak phase using the peak phase detected by the peak detecting section 1001 and the odd correlation phase from the odd correlation phase storage section 1003, and outputs the calculation result to the peak detecting section 1001. Here, a method for calculating the candidate peak phase using the candidate peak phase calculating section 1002 will be explain with reference to FIG. 12.

Figure 12A:
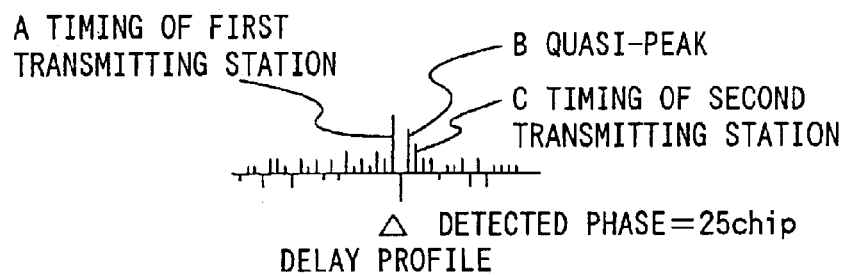
FIG. 12A is a schematic view showing one example of a delay profile generated by a delay profile generating section 105 of the receiving apparatus according to the fourth embodiment.
Figure 12B:
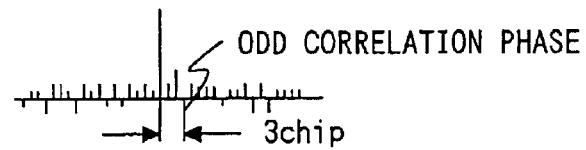
FIG. 12B is a schematic view showing the content of a spreading code auto-correlation value stored by an odd correlation phase storage section of the receiving apparatus according to the forth embodiment.
Figure 12C:
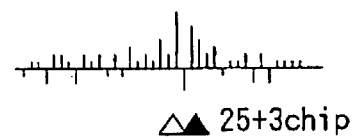
FIG. 12C is a schematic view showing a method for calculating a candidate peak phase using a candidate peak phase calculating section 1002 of the receiving apparatus according to the fourth embodiment.

FIG. 12A is a schematic view showing one example of the delay profile generated by the delay profile generating section 105 of the receiving apparatus according to the fourth embodiment. FIG. 12B is a schematic view showing the content of a spreading code auto-correlation value stored by the odd correlation phase storage section 1003 of the receiving apparatus according to the forth embodiment. FIG. 12C is a schematic view showing a method for calculating a candidate peak phase using the candidate peak phase calculating section 1002 of the receiving apparatus according to the fourth embodiment.

When the delay profile as shown in FIG. 12A is generated by the delay profile generating section 105, a peak correlation value at phase A corresponding to the first transmitting station is detected. Thereafter, a quasi-peak at phase B is detected. Here, when an odd correlation component of the signal from the first transmitting station matches a peak correlation value of the second transmitting station, there is a possibility that a peak correlation value at phase C corresponding to the second transmitting station will become small. Namely, there is a possibility that the peak correlation value corresponding to the second transmitting station should be originally detected after detecting the peak correlation value at phase A corresponding to the first transmitting station.

For this reason, according to this embodiment, first, the odd correlation phase storage section 1003 outputs the phase of the odd correlation value (odd correlation phase), which has a correlation value lower than the threshold value in the spreading code auto-correlation values as shown in FIG. 12B, to the candidate peak phase calculating section 1002. FIG. 12B shows one example in which the odd correlation phase corresponding to the peak phase of the second base station shown in FIG. 12A is calculated as 3 chip.

Moreover, it is assumed that the odd correlation phase from the odd correlation phase storage section 1003 and the peak phase of a certain transmitting station whose reception field intensity is lower than that of the first transmitting station are overlapped with each other. Then, the candidate peak phase calculating section 1002 calculates a candidate peak phase using the peak correlation value of the first transmitting station detected by the peak detecting section 1001 and the odd correlation phase. For example, when the peak phase of the first transmitting station shown in FIG. 12A is detected as 25 chip by the peak detecting section 1001, the peak phase of the second transmitting station shown in FIG. 12A, that is, the candidate peak phase is calculated as 25+3 chip as shown in FIG. 12C.

After the peak detecting section 1001 detects the peak phase of the first transmitting station, the candidate peak phase calculating section 1002 outputs the candidate peak phase thus calculated to the peak detecting section 1001. Then, the peak detecting section 1001 detects the candidate peak phase as a peak phase. Whereby, the peak phase of the second transmitting station is next detected. The above has explained the method for calculating the candidate peak phase using the candidate peak phase calculating section 1002.

Figure 13:
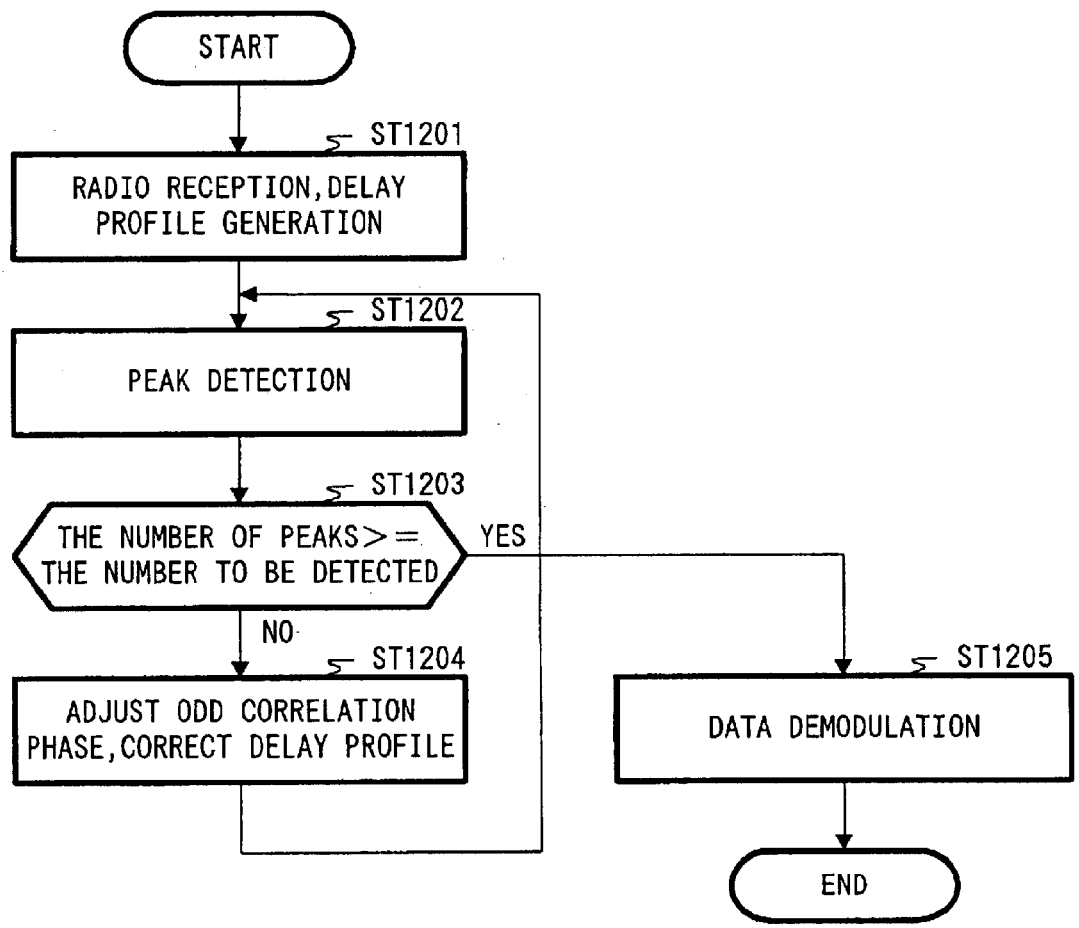
FIG. 13 is a flowchart showing a reception processing operation of the receiving apparatus according to the fourth embodiment.

The operation of the above-configured receiving apparatus will be next explained using the flowchart of FIG. 13. FIG. 13 is a flowchart showing a reception processing operation of the receiving apparatus according to the fourth embodiment.

First, in ST1201, the signals received via the antenna 101 are converted to baseband signals by the radio receiving section 102. Moreover, the correlation between the received baseband signal and the known spreading code is obtained by the correlation calculating section 103. Also, the delay profile is generated by the delay profile generating section 105.

In ST1202, the peak detecting section 401 detects the peak phases in the delay profile. At a first detecting time, since the peak phases, which are already detected, are not stored, a simple detection for a maximum value is performed and the phases of the detected correlation values are stored. At second detecting time and afterward, since the peak phases, which are already detected, are stored, the maximum value, except for the correlation value at the phase, is detected. Moreover, at the second detecting time and afterward, the correlation values at the candidate peak phase from the candidate peak phase calculating section 1002 are detected as peak phases if they are more than the threshold value. The detected peak phase is stored in the demodulation control section 111.

In ST1203, it is conformed whether or not the peak correlation values and the peak phases, which correspond to all transmitting stations to be detected, are detected. The transmitting stations to be detected are given using, for example, the number, or the threshold value in a reception level value of the peak correlation value and the like. When the peak correlation values and peak phases, which correspond to all transmitting stations, are detected, processing goes to ST1205. Conversely, when they are not detected, processing goes to ST1204.

In ST1204, the candidate peak phase calculating section 1002 adjusts the odd correlation phase in accordance with the detected peak phase and calculates the candidate peak phase, and outputs the calculation result to the peak detecting section 1001. After that, processing goes to ST1202.

In ST1205, the demodulation control section 111 outputs a timing signal for demodulating the signals from the respective transmitting stations to the baseband demodulation section 112. The baseband demodulation section 112 provides despread processing to the received baseband signal form the radio receiving section 102 based on the timing signal from the demodulation control section 111. This obtains demodulation data corresponding to each transmitting station.

As mentioned above, even when the original peak phase of the second transmitting station and the phase of the odd correlation component of the first transmitting station match each other, this phase is used as a candidate peak phase. When the correlation value at this candidate peak phase has a value of some degree, this candidate peak phase is detected as a peak phase of the second transmitting station. This makes it possible to detect the peak phase of the second transmitting station without fail even if the correlation value of the second transmitting station is small.

In this way, according to this embodiment, even when the phase of the peak correlation value of a certain transmitting station matches the phase of the odd correlation component having a large correlation value of the signal from the other transmitting station, the phase of the odd correlation component of the signal of the other transmitting station is calculated using the auto-correlation values calculated beforehand by use of the known spreading code. Then, at the time of detecting the peak phase of the transmitting station, a phase of a peak which has the correlation value of some degree at the calculated phase, is detected as a peak phase. This makes it possible to detect the peak phase of the transmitting station correctly with a small number of calculations even if the original peak correlation value of the transmitting station is small.

Moreover, the correlation storage section 108 of the first embodiment needs to store the spreading code auto-correlation values. In contrast, the odd correlation phase storage section 1003 of this embodiment stores only the phase of the odd correlation in the spreading code auto-correlation values. For this reason, this embodiment makes it possible to suppress the necessary memory quantity as compared with the first embodiment.

① The receiving apparatus of the present invention adopts a configuration comprising: delay profile generating means for generating a delay profile using correlation values calculated based on a received signal and a known spreading code; auto-correlation value calculating means for calculating auto-correlation values of the known spreading code; and demodulation timing detecting means for detecting demodulation timing of a certain transmitting station from the delay profile using the auto correlation values.

According to this configuration, the auto-correlation components of the certain transmitting station can be eliminated from the delay profile using the auto-correlation values of the known spreading code calculated beforehand. Also, the auto-correlation components of the certain transmitting station in the delay profile can be estimated. This makes it possible to correctly detect the peak phase of the certain transmitting station.

② The receiving apparatus of the present invention adopts a configuration wherein the demodulation timing detecting means comprises auto-correlation component calculating means for calculating auto-correlation components of a transmitting station from the auto-correlation values based on a peak phase and a peak correlation value of the transmitting station whose demodulation timing is already detected in the delay profile; eliminating means for eliminating the auto-correlation components of the transmitting station from the delay profile; and peak phase detecting means for detecting a peak phase of a certain transmitting station which is in a non-detection state, from the delay profile in which the auto-correlation components of the transmitting station are eliminated.

According to this configuration, even in a case where variations occur in reception field intensity of the signals from the respective transmitting stations, the auto-correlation components of the detected transmitting station are calculated using the auto-correlation values calculated beforehand by use of the known spreading code. The calculated auto-correlation components are eliminated from the correlation values in the delay profile. This makes it possible to detect the peak phase accurately with a small number of calculations in connection with the transmitting station whose reception field intensity is lower than that of the detected transmitting station.

③ The receiving apparatus of the present invention adopts a configuration wherein the demodulation timing detecting means comprises phase difference storage means for storing a phase difference between a peak correlation value and a quasi-peak correlation value in the auto-correlation values; candidate peak phase calculating means for calculating a candidate peak phase from the phase difference based on a peak phase of a certain transmitting station whose demodulation timing is already detected in the delay profile; and peak phase determining means for determining the peak phase of the certain transmitting station based on a demodulation result with demodulation timing at the candidate peak phase.

According to this configuration, there is a case that a quasi-peak, which has a value more than the original peak correlation value of a certain transmitting station, exists due to variations in the reception field intensity of the signal from the transmitting station at the delay profile generating time. Even in such a case, the phase difference between the quasi-peak phase with a correlation value of some degree and the original peak correlation value based on the spreading code auto-correlation value stored beforehand. The candidate peak phase is calculated using this phase difference. Moreover, by referring to the demodulation result based on the timing signal obtained by the detected peak phase and the candidate peak phase, it is possible to correctly detect the original correlation value peak of the transmitting station.

④ The receiving apparatus of the present invention adopts a configuration wherein the demodulation timing detecting means comprises phase difference storage means for storing a phase difference between a peak correlation value and a quasi-peak correlation value in the auto-correlation values; quasi-peak phase calculating means for calculating a phase of a quasi-peak of a transmitting station whose demodulation timing is already detected from the phase difference based on a peak phase of the transmitting station in the delay profile; and peak phase detecting means for detecting a peak phase of a transmitting station which is in a non-detection state, from the phases other than the quasi-peak in the delay profile.

According to this configuration, even in a case where variations occur in reception field intensity of the signals from the respective transmitting stations, the phase of the quasi-peak of the signal from the detected the transmitting station is calculated using the auto-correlation values calculated beforehand by use of the known spreading code. Then, at the next peak phase detecting time and afterward, the peak phase except for the calculated phase is detected. This makes it possible to detect the peak phase with a small number of calculations with respect to the transmitting station whose reception field intensity is lower than that of the detected the transmitting station.

⑤ The receiving apparatus of the present invention adopts a configuration wherein the demodulation timing detecting means comprises phase difference storage means for storing a phase difference between a peak correlation value and an odd correlation value in the auto-correlation values; odd correlation phase calculating means for calculating an odd phase of a transmitting station whose demodulation timing is already detected from the phase difference based on a peak phase of the communication in the delay profile; and peak phase detecting means for detecting the odd correlation phase as a peak phase of the transmitting station which is in a non-detection state, when the correlation value at the odd correlation phase in the delay profile is more than a threshold value.

According to this configuration, even when the peak correlation value of a certain transmitting station matches the odd correlation component having a large correlation value of the signal from the other transmitting station, the phase of the odd correlation component of the signal of the other transmitting station is calculated using the auto-correlation value calculated beforehand by use of the known spreading code. Then, at the time of detecting the peak phase of the transmitting station, one, which has the correlation value of some degree at the calculated phase, is detected as a peak phase. This makes it possible to detect the peak phase of the transmitting station correctly with a small number of calculations even if the original peak correlation value of the transmitting station is small.

⑥ The radio communication terminal apparatus of the present invention adopts a configuration having a receiving apparatus wherein the receiving apparatus comprises delay profile generating means for generating a delay profile using correlation values calculated based on a received signal and a known spreading code, auto-correlation value calculating means for calculating auto-correlation values of the known spreading code, and demodulation timing detecting means for detecting demodulation timing of a certain transmitting station from the delay profile using the auto correlation values.

According to this configuration, the provision of the receiving apparatus, which can correctly detect the peak phase of the transmitting station with a small number of calculations, and which makes it possible to provide the radio communication terminal apparatus, which performs synchronization capturing correctly.

(7) The base station apparatus of the present invention adopts a configuration, which performs radio communication with a radio communication terminal apparatus having a receiving apparatus, wherein the receiving apparatus comprises delay profile generating means for generating a delay profile using correlation values calculated based on a received signal and a known spreading code, auto-correlation value calculating means for calculating auto-correlation values of the known spreading code, and demodulation timing detecting means for detecting demodulation timing of a certain transmitting station from the delay profile using the auto correlation values.

According to this configuration, radio communication with the radio communication terminal apparatus, which performs synchronization capturing correctly, is carried out, whereby making it possible to provide the base station apparatus, which performs good communication.

(8) The synchronization capturing method of the present invention adopts a method comprising the steps of generating a delay profile using correlation values calculated based on a received signal and a known spreading code, calculating auto-correlation values of the known spreading code, calculating auto-correlation components of a transmitting station whose demodulation timing is already detected using the auto-correlation values, eliminating the auto-correlation components from the delay profile, and detecting a peak phase of a certain transmitting station from the delay profile in which the auto-correlation components of the transmitting station are eliminated.

According to this method, even in a case where variations occur in reception field intensity of the signals from the respective transmitting stations, the auto-correlation components of the detected transmitting station are calculated using the auto-correlation values calculated beforehand by use of the known spreading code. The calculated auto-correlation components are eliminated from the correlation value in the delay profile. This makes it possible to detect the peak phase accurately with a small number of calculations in connection with the transmitting station whose reception field intensity is lower than that of the detected transmitting station.

(9) A synchronization capturing method of the present invention adopts a method comprising the steps of generating a delay profile using correlation values calculated based on a received signal and a known spreading code, calculating auto-correlation values of the known spreading code, storing a phase difference between a peak correlation value and a quasi-peak correlation value or an odd correlation phase in the auto-correlation values, detecting a peak phase of a certain transmitting station from the delay profile based on a peak phase detected from the delay file and the phase difference.

According to this method, the peak phase of the certain transmitting station is detected in consideration of the phase of the correlation component of the certain transmitting station or the other transmitting station, which exerts an influence upon the detection of the peak correlation value of the certain transmitting station. This makes it possible to correctly detect the peak phase with a small number of calculations.

In addition, the receiving apparatus according to the above embodiment can be applied to the radio communication terminal apparatus and the base station apparatus in the digital radio communication system.

As explained above, the auto-correlation components of the transmitting station in the delay profile are calculated using the auto-correlation values of the known spreading code calculated beforehand. Then, the peak phase of the transmitting station to be demodulated is detected in consideration of the calculated auto-correlation components. This makes it possible to provide the receiving apparatus, which can correctly detect the original peak phase, which corresponds to each transmitting station, with a small number of calculations.

In addition, the receiving apparatus according to the above embodiment can be applied to the radio communication terminal apparatus and the base station apparatus in the digital radio communication system.

This application is based on the Japanese Patent Application No. HEI 11-110180 filed on Apr. 16, 1999, entire content of which is expressly incorporated by reference herein.

INDUSTRIAL APPLICABILITY

This invention is suitable for use in the CDMA communication field.

What is claimed is:

1. A receiving apparatus comprising:
   a delay profile generator that generates a first delay profile using a correlation value calculated based on a received signal and a known spreading code;
   an adjuster that adjusts an auto-correlation value of the known spreading code using a peak correlation value and a peak phase detected in the first delay profile;
   an eliminator that eliminates the adjusted auto-correlation value from the correlation value; and
   a peak phase detector that detects a peak phase of a certain transmitting station from a second delay profile obtained based on the correlation value from which the adjusted auto-correlation value is eliminated.

2. A radio communication terminal apparatus comprising the receiving apparatus according to claim 1.

3. A base station apparatus comprising the receiving apparatus according to claim 1.

4. A receiving apparatus comprising:
   a delay profile generator that generates a delay profile using a correlation value calculated based on a received signal and a known spreading code;
   a phase difference storage section that stores a phase difference between a peak correlation value and a quasi-peak correlation value or an odd correlation value within an auto-correlation profile of the known spreading code; and
   a peak phase detector that detects a peak phase of a certain transmitting station from the delay profile based on a peak phase detected from the delay profile and the phase difference.

5. The receiving apparatus according to claim 4, wherein the peak phase detector:
   calculates a candidate peak phase using the phase difference and a detected peak phase of a first transmitting station in the delay profile; and determines the peak phase of a second transmitting station based on a demodulation result obtained based on the candidate peak phase.

6. The receiving apparatus according to claim 4, wherein the peak phase detector:

calculates, based on a detected peak phase of a first transmitting station in the delay profile, a phase of a quasi-peak of a second transmitting station using the phase difference; and detects the peak phase of the second transmitting station from a phase other than the quasi-peak in the delay profile.

7. The receiving apparatus according to claim 4, wherein the peak phase detector:

calculates, based on a detected peak phase of a first transmitting station in the delay profile, an odd correlation phase of a second transmitting station using the phase difference; and detects the odd correlation phase as the peak phase of the second transmitting station when the correlation value at the odd correlation phase in the delay profile is equal to or greater than a threshold value.

8. A radio communication terminal apparatus comprising the receiving apparatus according to claim 4.

9. A base station apparatus comprising the receiving apparatus according to claim 4.

10. A synchronization capturing method comprising:

generating a first delay profile using a correlation value calculated based on a received signal and a known spreading code;

adjusting an auto-correlation value of the known spreading code using a peak correlation value and peak phase detected from the first delay profile; and eliminating the adjusted auto-correlation value from the correlation value;

generating a second delay profile using the correlation value from which the adjusted auto-correlation value is eliminated; and detecting a peak phase of a certain transmitting station from the second delay profile.

11. A synchronization capturing method comprising:

generating a delay profile using a correlation value calculated based on a received signal and a known spreading code;

storing a phase difference between a peak correlation value and a quasi-peak correlation value or an odd correlation value within an auto-correlation profile of the known spreading code; and detecting a peak phase of a certain transmitting station from the delay profile based on a peak phase detected from the delay profile and the phase difference.

* * * * *